United States Patent [19]
Rekow

[11] Patent Number: 6,081,637
[45] Date of Patent: Jun. 27, 2000

[54] ARRANGEMENT FOR MONITORING POWER OF DIODE-LASER-RADIATION LATERALLY COUPLED INTO AN OPTICAL-FIBER

[75] Inventor: Mathew Noel Rekow, Santa Cruz, Calif.

[73] Assignee: Coherent, Inc., Santa Clara, Calif.

[21] Appl. No.: 08/948,274

[22] Filed: Oct. 9, 1997

[51] Int. Cl.[7] .................................................. G02B 6/26
[52] U.S. Cl. ................................ 385/31; 385/27; 385/30; 385/42; 372/99
[58] Field of Search ................................... 385/31, 9, 14, 385/15, 20, 27, 30, 39, 43, 48, 42; 372/20, 99, 102

[56] References Cited

U.S. PATENT DOCUMENTS

| | | | |
|---|---|---|---|
| 4,130,343 | 12/1978 | Miller et al. | 350/96.15 |
| 5,734,766 | 3/1998 | Flint | 385/43 |
| 5,771,324 | 6/1998 | Hargris | 385/43 |

OTHER PUBLICATIONS

"Technique for Alignment of Semiconductor Lasers to Bevelled Single–Mode Fibres," B.M. Foley, P. Melman, K.T. Vo, *Electronic Letters*, vol. 26, No. 25, Dec. 6, 1990, pp. 2118–2120.

"Simple side coupler for coupling between laser diode and single–mode optical fiber," K.S. Lee & F.S. Barnes, *Applied Optics*, vol. 26, No. 12, Jun. 15, 1987, pp. 2294–2296.

*Primary Examiner*—Phan T. H. Palmer
*Attorney, Agent, or Firm*—Limbach & Limbach L.L.P.

[57] ABSTRACT

A method of monitoring power of laser-radiation laterally coupled from a diode-laser into an optical-fiber is disclosed. An input-end of the optical-fiber has a polished surface inclined at an angle to a longitudinal axis of the fiber. The input-end of the optical-fiber is arranged proximate an output-facet of the diode-laser such that radiation emitted from the facet is transmitted laterally into the optical-fiber and is incident internally on the polished surface. A fractionally-transmitting reflective coating is provided on the polished surface, whereby a fraction of the laser-radiation incident on the polished surface is transmitted out of the optical-fiber. A radiation-detector responsive to the laser-radiation is located in a position to receive the transmitted fraction of laser-radiation, thereby generating a signal which is interpreted as measure of power of the laser-radiation coupled into the optical-fiber.

20 Claims, 6 Drawing Sheets

DEVIATION FROM NOMINAL POLISH ANGLE of 45° (DEGREES)

DEVIATION FROM NOMINAL POLISH ANGLE of 45° (DEGREES)

ARRANGEMENT FOR MONITORING POWER OF DIODE-LASER-RADIATION LATERALLY COUPLED INTO AN OPTICAL-FIBER

BACKGROUND OF THE INVENTION

The present invention relates in general to monitoring power of diode-laser-radiation coupled into optical-fibers. It relates in particular to an arrangement for monitoring power of diode-laser-radiation coupled laterally into an optical-fiber at an end thereof having a polished surface at about forty-five degrees (45°) to the longitudinal axis of the fiber, the polished surface directing the coupled power along the fiber.

DISCUSSION OF BACKGROUND ART

In a diode-laser module wherein radiation from a diode-laser is coupled into an optical-fiber for delivery thereby, it is frequently desirable to provide some measure of power coupled into the fiber. This power measurement may then be used, for example, to control the output power of the diode-laser via an electronic feedback loop.

In most, if not all, practical diode-to-fiber coupling arrangements, spacing between the output-facet of a diode-laser and a fiber into which it is being coupled directly, or between the output-facet and a microlens which is being used to effect coupling, is only on the order of a few microns. Such a spacing is too small to accommodate a beamsplitter for sampling a fraction of the output beam then interpreting the sampled power as an indirect measurement of coupled power. Accordingly, prior-art methods for indirectly measuring power measurement have involved placing an radiation-detector in the neighborhood of the output-facet to detect stray radiation reflected or scattered from the optical-fiber or any intervening microlens. Such indirect methods are prone to inaccuracy due, among other things, to the low level of such scattered radiation and noise problems associated therewith.

A preferred prior-art method for directly monitoring coupled power involves providing an optical-fiber junction or optical-fiber "tap" which can be used to sample power which has actually been coupled into the fiber. This method, however, involves a delicate manufacturing step for forming the junction or tap, the cost of which may be prohibitive for fiber-coupled diode-laser modules which often must be sold at low cost in a very competitive market. Further, such taps and junctions occupy valuable space in modules which are often required to be as compact as practically possible.

A particularly compact and rugged diode-to-fiber coupling method is disclosed in U.S. Pat. No. 4,130,343 and further investigated in papers by Lee et al., "Simple side coupler for coupling between diode-laser and single mode optical-fiber", Appl. Opt. 26, 12, pp. 2294–2296 (Jun. 15, 1987) and Foley et al, "Technique for alignment of semiconductor lasers to bevelled single mode fibers", Electronics Letters, 26, 25, pp. 2118–2120 (Dec. 6, 1990). In this method, diode-laser-radiation is coupled laterally into an optical-fiber at an end thereof having a polished surface at about forty-five degrees to the longitudinal axis of the fiber. The polished surface is for directing the coupled power along the optical-fiber toward its output-end. The polished surface is provided with a metallic coating of aluminum (the '343 patent) or gold (the Lee et al. paper), presumably to reflect that portion of coupled radiation which is not reflected as a result of total internal reflection (TIR) by the polished surface.

There is a need for a direct power monitoring arrangement for the above-discussed lateral coupling method. Preferably, the monitoring arrangement should be as rugged and compact as the coupling method itself, and should not add significant cost to a diode-laser module incorporating the coupling method.

SUMMARY OF THE INVENTION

The present invention is directed to a method of monitoring power of laser-radiation laterally coupled from a diode-laser into an optical-fiber, for delivery by the optical-fiber to a point of use. The diode-laser has an output-facet from which the laser-radiation is emitted, and an input-end of the optical-fiber has a polished surface inclined at an angle to a longitudinal axis of the fiber. The input-end of the optical-fiber is arranged proximate the output-facet such that radiation emitted from the facet is transmitted laterally into the optical-fiber and is incident internally on the polished surface for reflection therefrom generally longitudinally along the optical-fiber. The method of determining the power of laser-radiation coupled into the optical-fiber comprises providing a reflective coating on the polished surface, the reflective coating being arranged to transmit a fraction of the laser-radiation incident on the polished surface out of the optical-fiber. A radiation-detector responsive to the laser-radiation is located in a position to receive the transmitted fraction of laser-radiation. A signal generated by the radiation-detector in response to the received, transmitted fraction of laser-radiation is interpreted as a measure of power of the laser-radiation coupled into the optical-fiber.

In a preferred embodiment of the present invention, the fractionally-transmitting reflective coating is a multilayer, dielectric coating having a plurality of layers of different refractive index. The number and thickness of the layers is arranged to reflect less than one-hundred percent of the laser-radiation incident thereon, and to transmit the remaining fraction. In another embodiment of the present invention, the coating may be a layer of metal having a thickness selected such that a fraction of the laser-radiation incident thereon is transmitted through the layer. In yet another embodiment of the present invention, the fractionally-transmitting coating may be a multilayer dielectric coating or a metal layer having an aperture therein for transmitting laser-radiation incident thereon.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
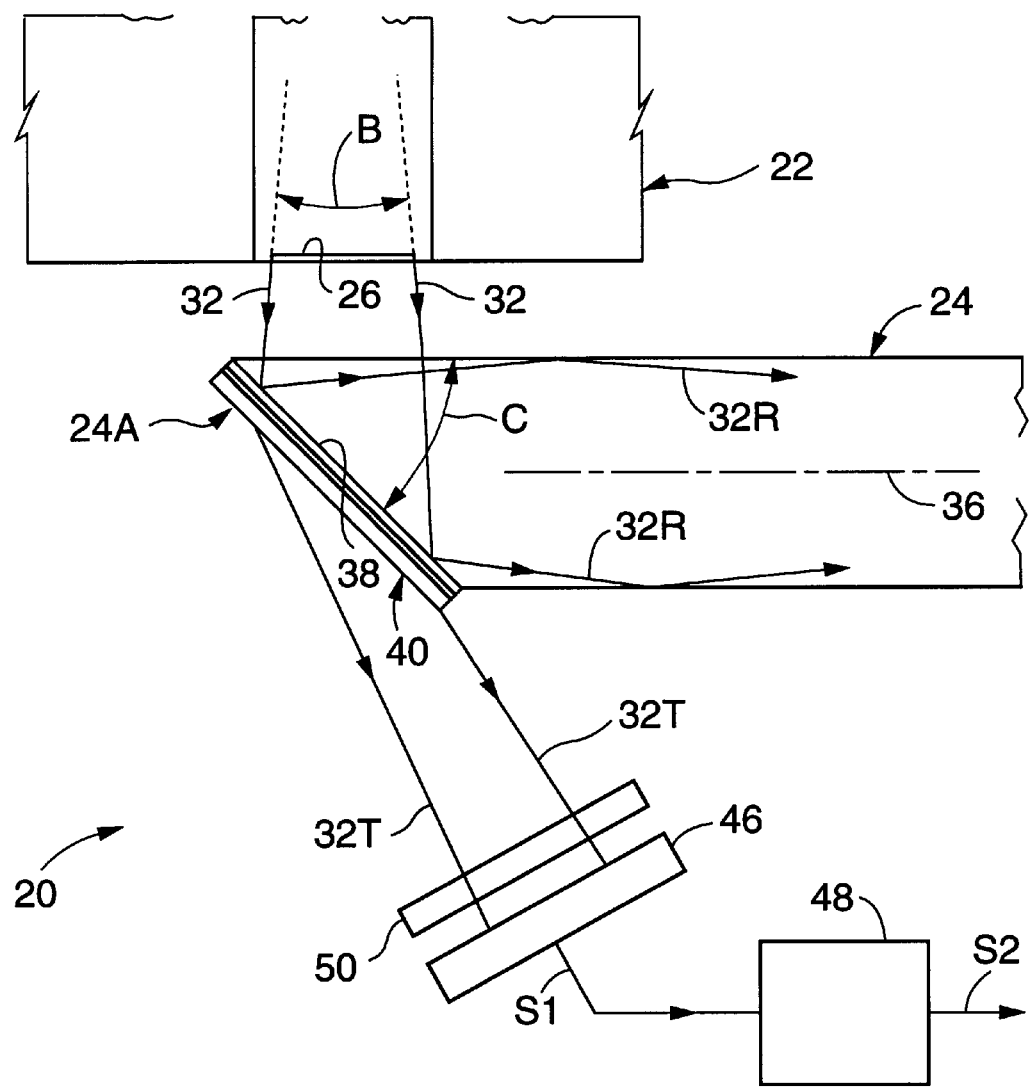
FIG. 1 is a two-dimensional view schematically illustrating one preferred embodiment of a power monitoring arrangement in accordance with the present invention, in a side-coupled, diode-to-fiber assembly.
Figure 2:
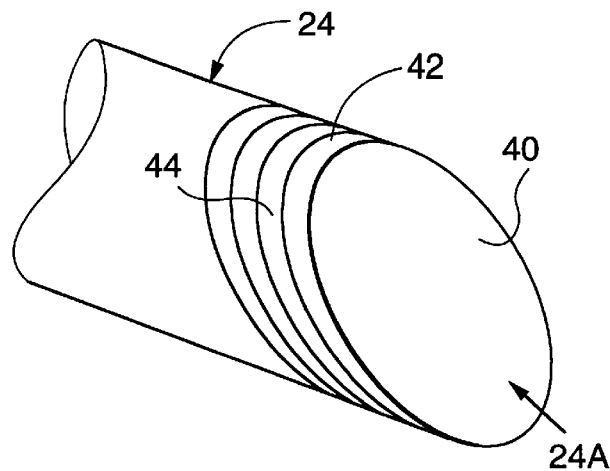
FIG. 2 is a perspective view schematically illustrating the form of a diode-laser output beam in the assembly of FIG. 1.
Figure 3:
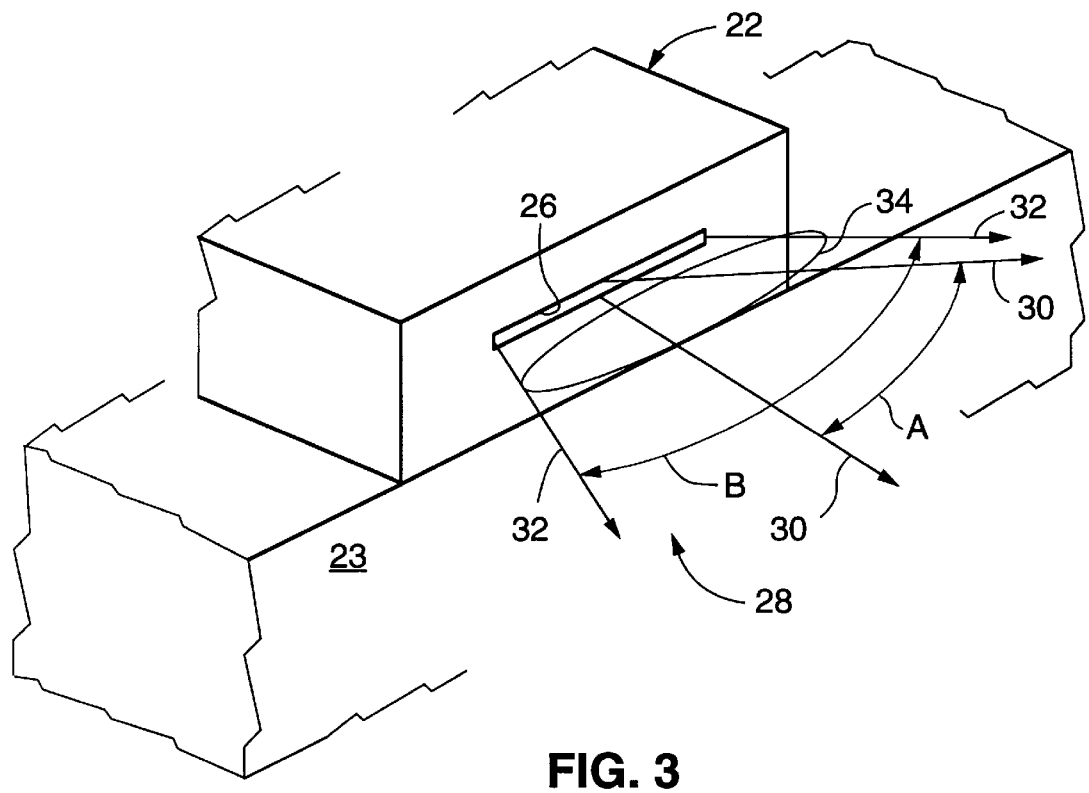
FIG. 3 is a perspective view schematically illustrating one end of an optical-fiber in the assembly of FIG. 1, the fiber having a multilayer-dielectric-coated, polished surface at a polish-angle of forty-five degrees to the longitudinal axis of the fiber.

Turning now to the drawings, FIG. 1, FIG. 2 and FIG. 3 schematically illustrate a preferred embodiment 20 of an arrangement for monitoring power coupled laterally from a diode-laser 22 into an optical-fiber 24. Optical-fiber 24 is preferably a clad fiber. Illustration of fiber cladding is omitted in FIG. 1, for clarity.

Diode-laser 22 includes an elongated output-facet 26 from which laser-radiation 28 is emitted. Diode-laser 22 is mounted on a sub-mount 23 (see FIG. 3), one purpose of which is conducted away heat generated during operation of diode-laser 22. Radiation 28 is typically emitted in so called "fast" and "slow" axes. In the fast axis, radiation is emitted with a relatively high divergence (for example a half-angle of about 25° or more), as illustrated by arc A and arrows 30 (see FIG. 2). In the slow axis, radiation is emitted with a relatively low divergence (for example a half-angle of about 10°), as illustrated by arc B and arrows 32 (see FIGS. 1 and 2). Because of this, an emitted beam has an elongated, somewhat elliptical cross-section 34 (see FIG. 2). Optical-fiber 24 has a longitudinal axis 36 which is preferably, but not necessarily, arranged (inclined) parallel to output-facet 26.

An end 24A of optical-fiber 24, which can be conveniently defined as an input-end of the optical-fiber, has a polished surface 38 generated thereon. Surface 38 is preferably a plane-polished surface, and is inclined at an angle C (see FIG. 1) to longitudinal axis 36. Angle C may be conveniently defined as the polish-angle of surface 38.

Deposited on polished surface 38 is a partially-transmissive or fractionally-transmissive, reflective coating 40 (see FIGS. 1 and 2). For reasons which will be explained in detail further hereinbelow, coating 40 is preferably a multilayer dielectric coating, including a plurality of layers 42 and 44 (see FIG. 2) of different refractive index.

Continuing with reference to FIG. 1, laser-radiation 32 incident on surface 38 is divided into a reflected fraction and a transmitted fraction, indicated by arrows 32R and 32T respectively. Reflected fraction 32R is directed generally longitudinally along fiber 24. A radiation detector 46, preferably a photo-diode, is located in a position to receive at least a portion of transmitted fraction 32T of laser-radiation 32. Transmitted fraction 32T is preferably arranged to be about 0.5 percent. Processing circuitry 48, connected to radiation-detector 46, interprets a signal S1, generated by the radiation-detector, as a measure of power of laser-radiation 32R, i.e., that laser-radiation which is coupled into optical-fiber 24. Processing circuitry 48 may be arranged to provide a signal S2 representative of coupled laser-radiation for controlling diode-laser 22 to maintain coupled radiation at a desired level.

The importance of coating 40 in the power monitoring scheme of the present invention may be better understood by first considering those factors which contribute to optimal coupling of laser-radiation 32 into optical-fiber 24 in the absence of any coating on surface 38. These factors are reflection of surface 38 as a function of angle considering total internal reflection (TIR) effects or contributions; change in interception cross-section of surface 38 as a function of polish-angle; and acceptance angle or numerical aperture (NA) of optical-fiber 24. The effects of these factors on coupling efficiency are exemplified below with reference to an optical-fiber 24 having a core 100.0 micrometers ($\mu$m) in diameter and a core refractive index of 1.45, which is about the value for fused silica in the 700 to 900 nm wavelength range of diode-laser-radiation. Optical-fiber 24 is assumed to have a cladding thickness of 12.5 $\mu$m with a cladding refractive index of 1.54. Facet 26 of diode-laser 22 is assumed to have a width of 100.0 $\mu$m and assumed to be located at a distance of 27.6 $\mu$m from optical-fiber 24. Longitudinal axis 36 of optical-fiber 24 is assumed to be parallel to facet 26, i.e., perpendicular to the general emission-direction of laser-radiation 32.

Figure 4:
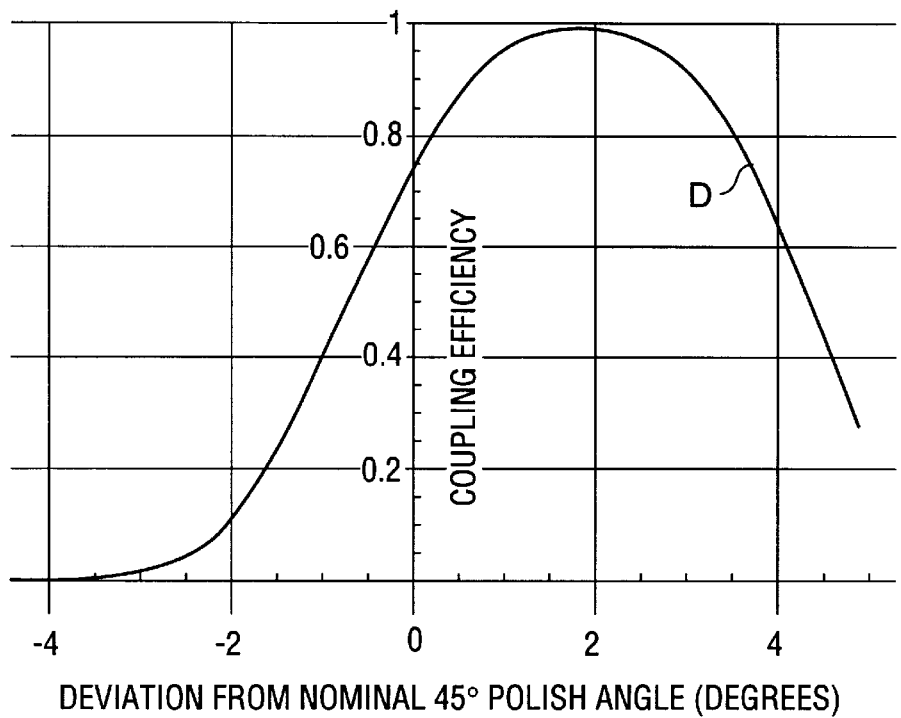
FIG. 4 is a graph schematically illustrating computed coupling efficiency as a function of polish-angle in the diode-to-fiber coupling assembly of FIG. 1, considering effects of numerical aperture of the optical-fiber and total internal reflectance at the polished surface of FIG. 3, the optical-fiber having a core refractive index of 1.45.

Referring to FIG. 4, computed coupling efficiency as a function of variations in polish-angle from a nominal 45° polish-angle on laser-radiation fraction reflected by TIR contribution (only) from surface 38 is illustrated (curve D). It can be seen that coupling efficiency due to TIR contribution is rapidly varying about the nominal angle and falls to about one-tenth of a maximum value at a deviation from nominal of minus about 2°, and falls to zero as the TIR contribution falls to zero. At higher angles, fall off of coupling efficiency, after a maximum value is reached, is due to NA of optical-fiber 24.

It should be noted here that the term TIR contribution is used to indicate that in a divergent beam some rays may be incident on polished-surface 38 at less that a critical angle required to provide true total reflection. In the absence of a reflective coating, these rays are partially reflected and partially transmitted to some degree. With this in mind, the term internal reflection is used alternatively in discussion of reflection from polished surface 38 that is due to surface effects in the absence of a reflective coating.

Figure 5:
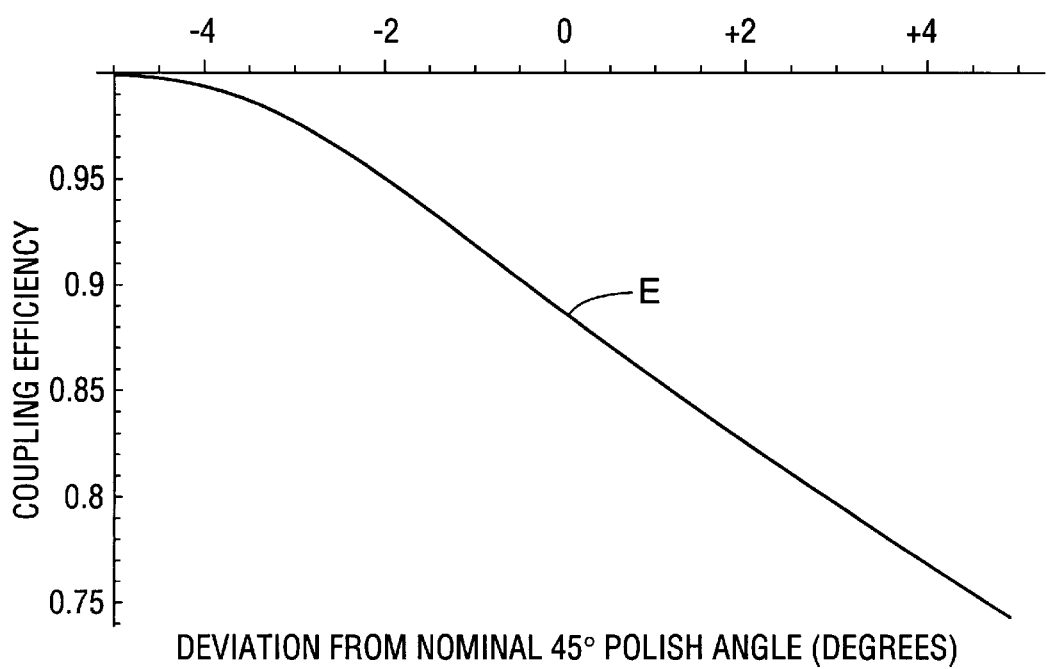
FIG. 5 is a graph schematically illustrating computed coupling efficiency as a function of polish-angle in the diode-to-fiber coupling assembly of FIG. 1, considering only effects of the polish-angle of the polished surface of FIG. 3.

Referring to FIG. 5, computed coupling efficiency as a function of variations in polish-angle from a nominal 45° polish-angle, considering only the change in beam-interception cross-section of surface 38, is illustrated (curve E). As may be expected, coupling efficiency increases with decreasing angle, as the apparent cross-section of surface 38 seen by laser-radiation 32 is elongated.

Figure 6:
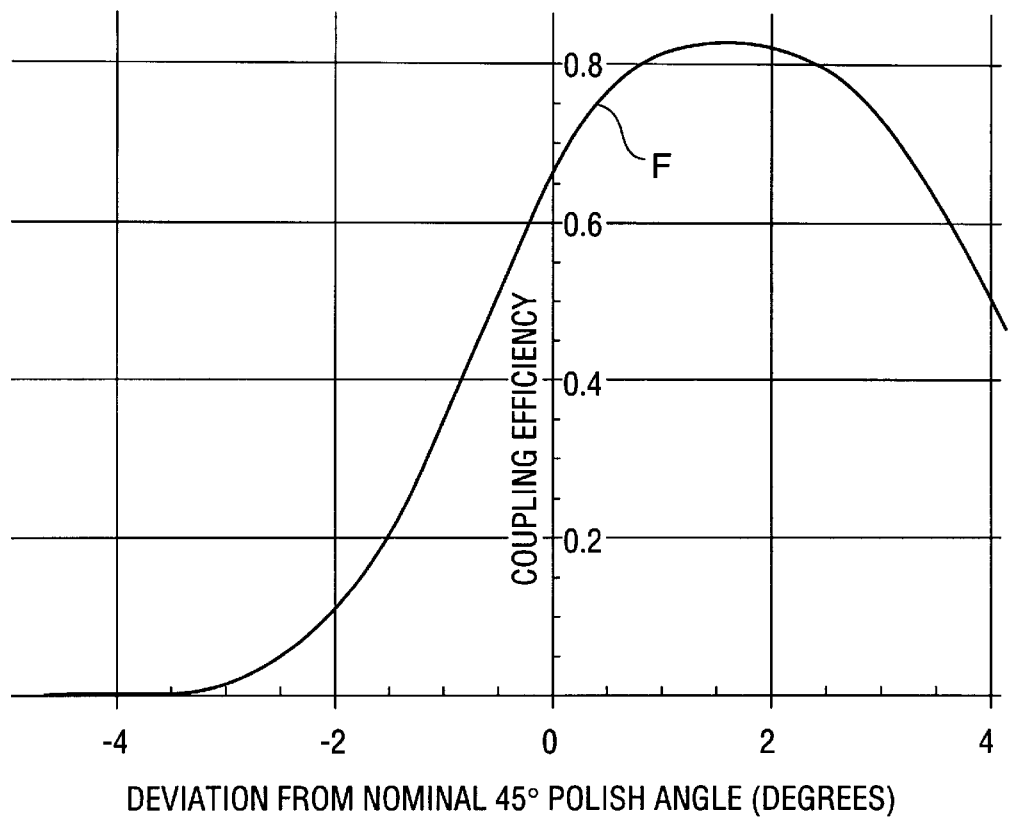
FIG. 6 is a graph schematically illustrating computed coupling efficiency as a function of polish-angle in the diode-to-fiber coupling assembly of FIG. 1, considering the effects of the polish-angle of FIG. 5 and limiting effects of the numerical aperture of the fiber and total internal reflectance FIG. 4.

Referring to FIG. 6, computed coupling efficiency as a function of variations in polish-angle from a nominal 45° polish-angle considering the N/A and TIR contribution effects of FIG. 4, and the beam-interception cross-section effects of FIG. 5 is illustrated (curve F). It can be seen that the cross-section contribution of FIG. 5 provides some improvement of coupling efficiency at angles less than 45°. This improvement is overwhelmed, however, by the TIR contribution fall-off of FIG. 5.

Figure 7:
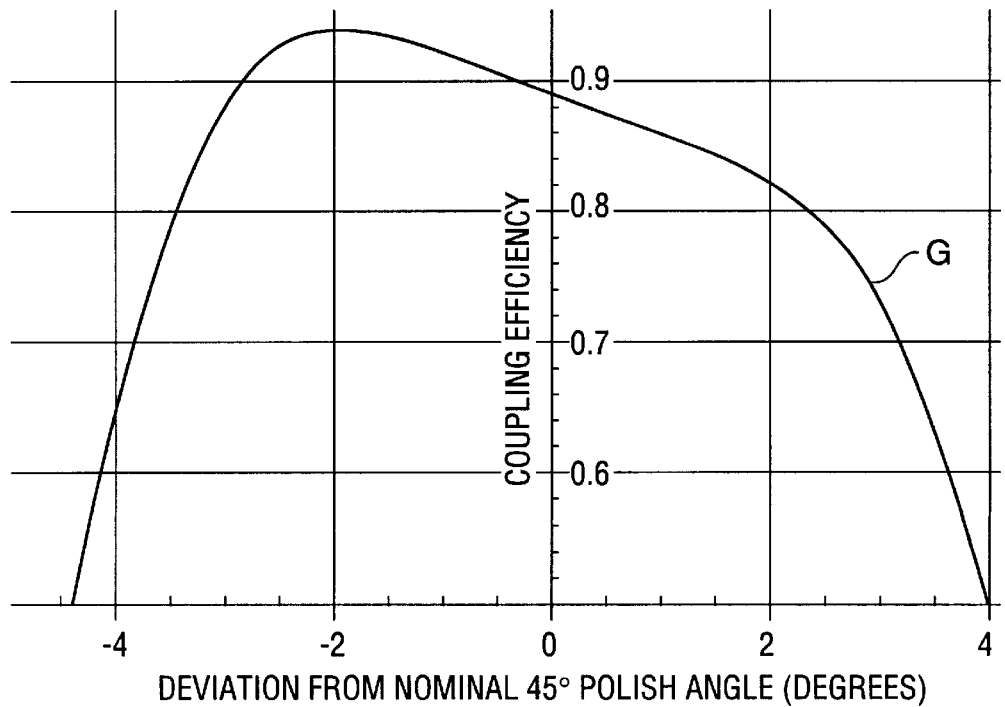
FIG. 7 is a graph schematically illustrating computed coupling efficiency as a function of polish-angle in the diode-to-fiber coupling assembly of FIG. 1, considering the effects of the polish-angle of FIG. 5 and limiting effects of the numerical aperture of the diode-laser output beam of FIG. 2, with total internal reflectance effects of FIG. 4 eliminated to simulate a one-hundred percent reflecting coating on the polished surface.

FIG. 7 schematically illustrates computed coupling efficiency (curve G) as a function of variations in polish-angle from a nominal 45° polish-angle considering a combination of N/A effects with beam-interception cross-section effects only, i.e., without considering TIR contribution effects of FIG. 4. This, in effect, provides an indication of what coupling efficiency would be were surface 38 coated with a one-hundred percent reflective coating. It can be seen that coupling efficiency is at a maximum at a polish-angle of about 43°. This is consistent with an experimental observation of coupling efficiency with polish-angle disclosed in the above-referenced '343 patent. At this angle, coupling efficiency is about ten percent higher than at a 45° polish-angle. Steep fall-off of coupling efficiency at polish-angles less than 40° and greater than 50° is primarily due to NA effects.

It should be noted here, that while variation of coupling parameters with polish-angle for a fixed orientation of optical-fiber 24 with respect to diode-laser facet 26 are discussed-above, similar parameter variations (at least within the same range of angles) would be observed were polish-angle C (see FIG. 1) fixed, at say 45°, and the inclination of surface 38 to incident radiation 32 varied by varying the inclination of fiber axis 36 to facet 26. Given the freedom to adjust inclination of optical-fiber 24 to output-facet 26 a preferred range of polish-angles for polished-surface 38 is between about 35° and 55°. A range of polish-angle between about 40° and 50° is preferred when longitudinal axis 36 is held parallel to output-facet 26. In general terms, overall coupling efficiency can be optimized by selecting an appropriate inclination of polished-surface 38 to laser-radiation 32.

Comparison of curves F and G indicates that in order to achieve this optimum efficiency, a coating on surface 38 must be relied on to do the majority of the work in coupling laser-radiation into optical-fiber 24. This is because TIR at this angle, at least for a fiber-core refractive index of 1.45, is only marginally effective in reflecting radiation. In above-discussed, prior-art lateral coupling arrangements, coatings of gold or aluminum have been relied on to provide reflection where TIR fails to do so. Such coatings, however, fall significantly short of providing one-hundred percent reflection at near infrared (NIR) diode-laser wavelengths, i.e., between about 700 and 900 nm.

While gold and aluminum are generally assumed to be highly reflecting metals, reflection from these metals is less, the higher the refractive index of the medium from which radiation is incident on them. In addition, aluminum has a characteristic dip in reflection in the 700 to 900 nanometer (nm) wavelength region. In this wavelength region, seen from a medium having a refractive index of 1.45, a layer of gold having a thickness sufficient that no radiation is transmitted has an average reflection of about ninety-six percent. A layer of aluminum having a thickness sufficient that no radiation is transmitted has an average reflection of only about eighty-three percent. In the case of each layer, that radiation which is not reflected is absorbed, in effect, wasted. As can be appreciated from above-discussed gold and aluminum reflectivity values, the fractional loss of coupled power, due to absorption by prior-art metallic coatings, can be comparable or even greater than fractional improvement in coupling efficiency available by selection of an optimum polish-angle.

Figure 8:
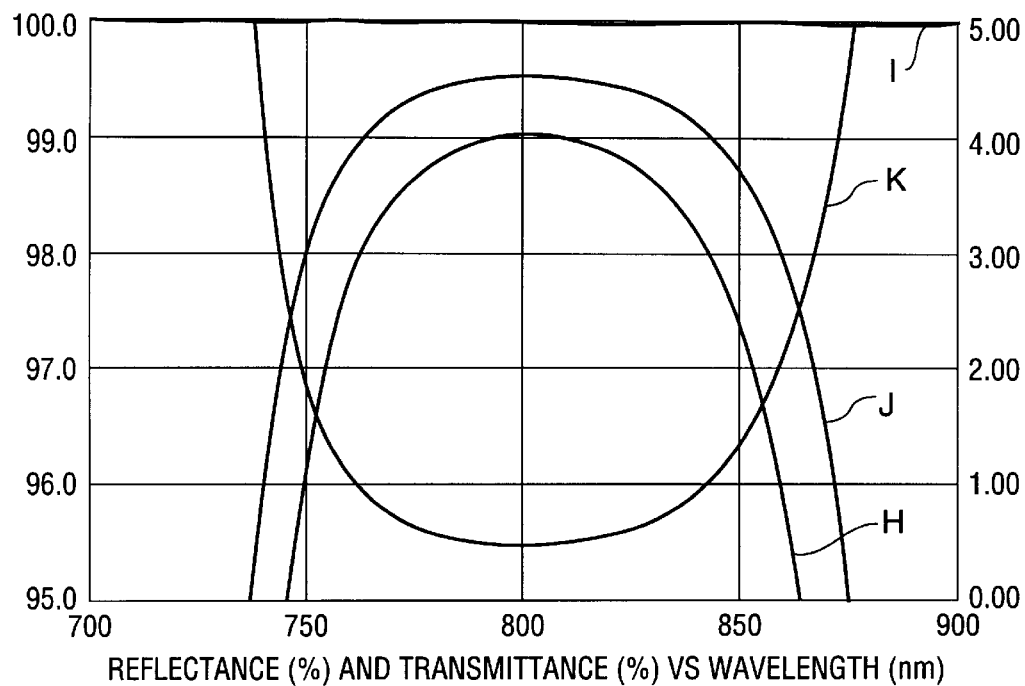
FIG. 8 is a graph schematically illustrating computed reflectance and transmittance as a function of wavelength and polarization-orientation in one example of the multilayer dielectric coating of FIG. 3.

Referring now to FIG. 8, computed reflection is illustrated as a function of wavelength for radiation polarized in planes parallel (curve H) and perpendicular (curve I) to the plane of incidence of surface 38, and for unpolarized radiation (curve J), for a twenty-three-layer, all-dielectric coating. Transmission for unpolarized light is illustrated by curve K. Radiation is assumed to be diverging with a 3.5° half-angle.

Layers of the coating are assumed to be alternating layers of niobium oxide ($Nb_2O_5$) and silicon dioxide ($SiO_2$) with a total of twelve $NB_2O_5$ layers and eleven $SiO_2$ layers. $Nb_2O_5$ layers and $SiO_2$ layers are assumed to have respectively an optical thickness of about 1.10 and 1.33 quarter-wavelengths at a wavelength of 800 nm. Refractive indices for $Nb_2O_5$ and $SiO_2$ at 800 nm are assumed to be about 2.29 and 1.44 respectively. Each layer is assumed to have an extinction coefficient less than 0.0001. While this extinction coefficient value may not be achievable universally by commercial optical coating manufacturers, it is believed that most, if not all, manufacturers could provide a comparable coating having no greater than 0.5 percent loss due to scatter and absorption.

It should be noted that twenty-three layers is more than twice the amount of layers that would be required, using the same layer materials, to provide the maximum reflectivity of curve K for unpolarized radiation incident on the layers, from air, at normal incidence. This is because of strong polarization effects exhibited by the dielectric materials when light is incident thereon from a material having a refractive index typical of fiber-core materials. While curve K illustrates transmission of unpolarized, incident light, the light actually transmitted is plane-polarized, as essentially none of the perpendicular component of incident radiation is transmitted.

An important advantage a dielectric coating of FIG. 8 is that, even though some radiation is transmitted to achieve power-monitoring objectives of the present invention, the high reflectivity of the coating provides that coupling efficiency is significantly improved compared with corresponding, prior-art lateral coupling arrangements which rely on metal coatings. Further, as that light which is transmitted and is incident on radiation detector 46 of FIG. 1 is plane-polarized, an appropriately aligned plane polarizer 50 may be optionally located in front of radiation detector 46 to provide a measure of discrimination of transmitted radiation 32T against any stray radiation which may be present.

From the discussion presented above, it may occur to one skilled in that art to which the present invention pertains that a multilayer dielectric coating is not necessary to achieve power-monitoring objectives of the present invention. For example, a metal reflective layer may be made sufficiently thin that some fraction of light incident thereon is transmitted. Further by way of example, one or more apertures may be provided in an otherwise-opaque reflective metal layer, (or even in a multilayer dielectric coating with otherwise-negligible transmission) to render the layer or coating usefully, partially transmissive for power-monitoring purposes of the present invention. It must be expected, however, that above-discussed, less-than-optimum reflection of radiation from metal layers would be further reduced by at least the amount of radiation transmitted.

In still another preferred embodiment of the present invention it is possible to dispense with coating 40 altogether and select polish-angle C such that reflection due to TIR contribution is on the order of about 99.5%, thereby allowing a 0.5% leakage of laser-radiation through polished surface 38 for monitoring purposes. In the above exemplified case of an optical-fiber having a refractive index of 1.45 however, this would require a polish-angle of about 47° which would mean operating at 10 percent less than optimum coupling efficiency. This can be rectified, in theory at least, by selecting a fiber having a greater core refractive index.

Figure 9:
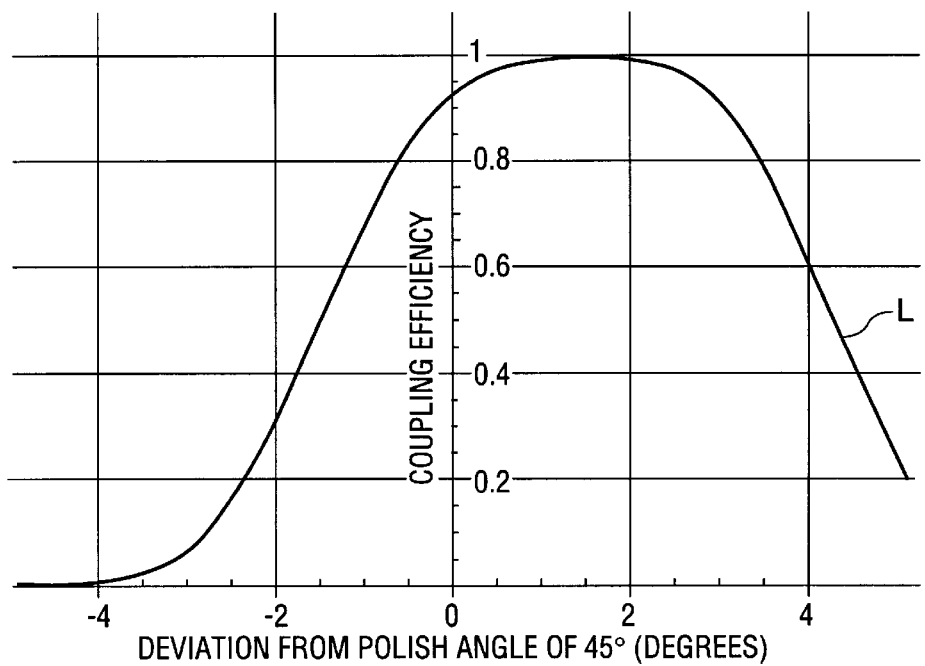
FIG. 9 is a graph schematically illustrating computed coupling efficiency as a function of polish-angle in the diode-to-fiber coupling assembly of FIG. 1, considering effects of numerical aperture of the optical-fiber and total internal reflectance at the polished surface of FIG. 3, the optical-fiber having a core refractive index of 1.5.
Figure 10:
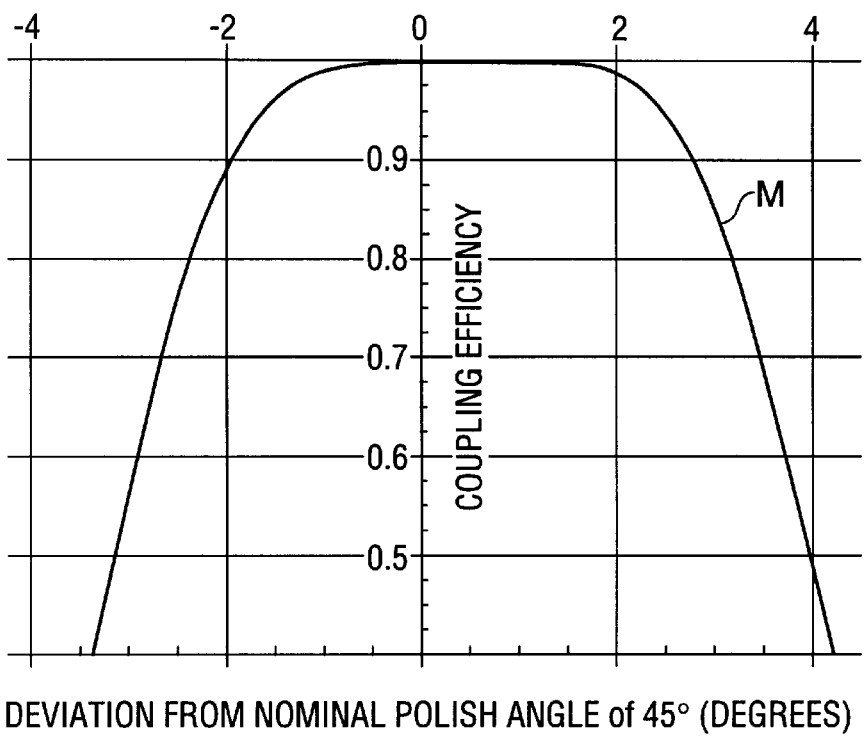
FIG. 10 is a graph schematically illustrating computed coupling efficiency as a function of polish-angle in the diode-to-fiber coupling assembly of FIG. 1, considering effects of numerical aperture of the optical-fiber and total internal reflectance at the polished surface of FIG. 3, the optical-fiber having a core refractive index of 1.6.
Figure 11:
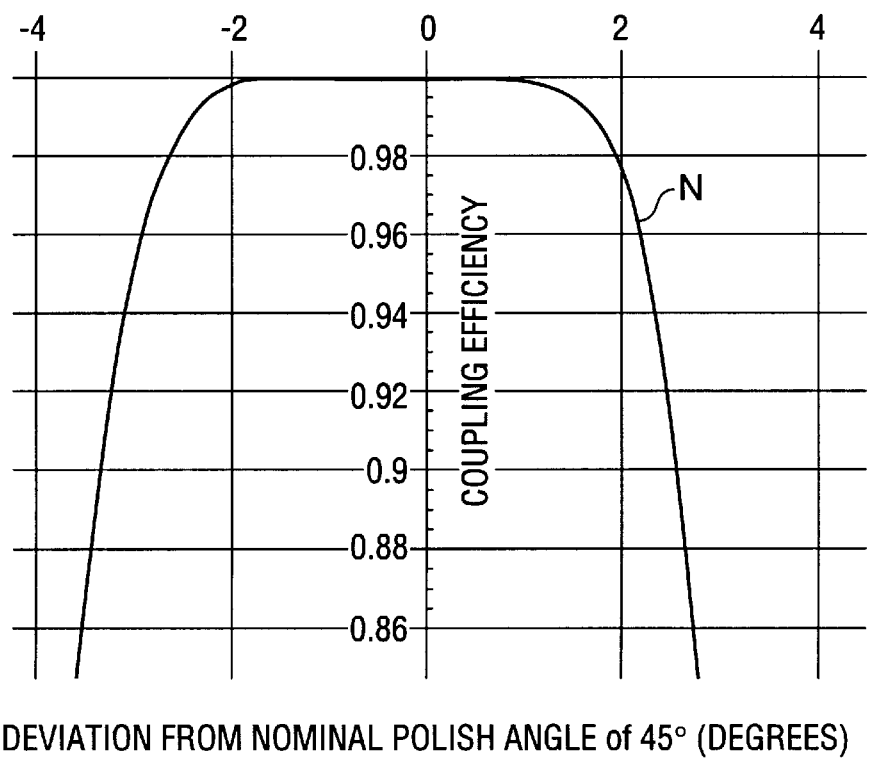
FIG. 11 is a graph schematically illustrating computed coupling efficiency as a function of polish-angle in the diode-to-fiber coupling assembly of FIG. 1, considering effects of numerical aperture of the optical-fiber and total internal reflectance at the polished surface of FIG. 3, the optical-fiber having a core refractive index of 1.7.

By way of example, FIGS. 9, 10, and 11 illustrate computed coupling efficiency due to internal reflection for optical-fibers having core indices of 1.50, 1.60 and 1.70 respectively (curves L, M and N) respectively. It can be seen that the effect of increasing core refractive index is that the (internal reflection) coupling efficiency/polish-angle function peaks at smaller polish-angles, while a range of angles over which near peak (internal reflection) coupling efficiency is available increases.

In the case of a 1.7 core refractive index optical-fiber (FIG. 11, curve N), for example, it can be seen that a very high coupling efficiency is available at an angle at which coupling efficiency due to the interception cross-section of surface 38 is near optimum see FIG. 5. Accordingly, in theory at least it is possible to select a fiber having a core index which will produce a preferred reflection and transmission of radiation at polished-surface 38 due to TIR only, at a polish-angle which makes maximum use of the increase in coupling efficiency due to cross-section effects at small polish-angles.

It should be noted, however, that while optical-fibers having a core refractive index as high as 1.70 can be produced, they are not routinely produced by optical-fiber manufacturers. Accordingly, cost of material, together with relatively small production quantities may combine to make the cost of such a fiber without a coating more expensive than a polished fiber having the more common 1.45 core index including a multilayer dielectric coating.

The present invention has been described as a preferred and other embodiments, the present invention is not limited, however, to those embodiments described and depicted. Rather, the invention is defined by the claims appended hereto.

What is claimed is:

1. A laser-radiation delivery system comprising:
   a diode-laser having an output-facet from which the laser-radiation is emitted;
   an optical-fiber for delivering the laser-radiation, said optical-fiber having a polished surface on an input-end thereof, said polished surface inclined at an angle to a longitudinal axis of the optical-fiber;
   said input-end of the optical-fiber being arranged proximate said output-facet of said diode-laser such that radiation emitted from said output-facet is transmitted laterally into said optical-fiber and is incident internally on said polished surface for reflection therefrom generally longitudinally along said optical-fiber;
   said polished-surface having a reflective coating thereon, said reflective coating arranged to transmit a fraction of the laser-radiation incident on said polished surface, out of said optical-fiber at said input end thereof; and
   a radiation-detector responsive to the laser-radiation, said radiation-detector located in a position to receive at least a portion of said transmitted fraction of laser-radiation and generating a signal in response thereto.

2. The system of claim 1 wherein said longitudinal axis of said optical-fiber is oriented generally parallel to said output-facet of said diode-laser.

3. The system of claim 2 wherein said polished surface is inclined at an angle between about 40 and 50 degrees to said longitudinal axis of said optical-fiber.

4. The system of claim 2 wherein said optical-fiber has a core refractive index of about 1.45 at the wavelength of the laser-radiation, and said polished surface is inclined at an angle of about 43 degrees to said longitudinal axis of said optical-fiber.

5. The system of claim 1 further including electronic circuitry for receiving the signal from the radiation detector and determining the power of the laser-radiation coupled into the optical fiber.

6. The system of claim 1, wherein said reflective coating is a multilayer dielectric coating including layers having different refractive index.

7. The system of claim 1 wherein said reflective coating is arranged to transmit about 0.5 percent of radiation from said diode-laser incident thereon.

8. The system of claim 1 wherein said reflective coating is a metal coating.

9. The system of claim 1 wherein said polished-surface is inclined to said longitudinal axis of said optical-fiber at an angle between about 35 and 55 degrees.

10. A laser-radiation delivery system, comprising;
    a diode-laser having an output-facet from which the laser-radiation is emitted;
    an optical-fiber for delivering the laser-radiation, said optical-fiber having a polished surface on an input-end thereof, said polished surface inclined at an angle to a longitudinal axis of the optical-fiber;
    said input-end of the optical-fiber being arranged proximate said output-facet of said diode-laser such that radiation emitted from said output-facet is transmitted laterally into said optical-fiber and is incident internally on said polished surface, said inclination angle of said polished surface being selected such that a first fraction of said incident reflection is transmitted through said polished surface out of said optical-fiber and a second fraction of said incident radiation is internally reflected from said polished surface generally longitudinally along said optical-fiber; and
    a radiation-detector responsive to the laser-radiation, said radiation-detector located in a position to receive at least a portion of said first fraction of laser-radiation and generating a signal in response thereto.

11. The system of claim 10 wherein said longitudinal axis of said optical-fiber is oriented generally parallel to said output-facet of said diode-laser.

12. The system of claim 11 wherein said polished surface is inclined at an angle between about 40 and 50 degrees to said longitudinal axis of said optical-fiber.

13. The system of claim 12, wherein said optical-fiber has a core refractive index of about 1.7 at the wavelength of the laser-radiation, and said polished surface is inclined at an angle of about 43 degrees to said longitudinal axis of said optical-fiber.

14. The system of claim 10, wherein said optical-fiber has a core refractive index greater than 1.45 at the wavelength of the laser-radiation.

15. The system of claim 10 wherein said polished-surface is inclined to said longitudinal axis of said optical-fiber at an angle between about 35 and 55 degrees.

16. The system of claim 10 further including electronic circuitry for receiving the signal from the radiation detector and determining the power of the laser-radiation coupled into the optical fiber.

17. In an arrangement for coupling laser-radiation from a diode-laser into an optical-fiber, the diode-laser having an output-facet from which the laser-radiation is emitted, an input-end of the optical-fiber having a polished surface inclined at an angle to a longitudinal axis of the fiber, the input-end of the optical-fiber being arranged proximate the output-facet such that radiation emitted from the facet is transmitted laterally into the optical-fiber and is incident internally on the polished surface for reflection therefrom generally longitudinally along the optical-fiber, a method of monitoring power of laser-radiation coupled into the optical-fiber comprising the steps of:

(a) providing a reflective coating on the polished surface, said reflective coating arranged to transmit a fraction of the laser-radiation incident on the polished surface out of the optical-fiber;

(b) providing a radiation-detector responsive to the laser-radiation;

(c) locating said radiation-detector in a position to receive at least a portion of said transmitted fraction of laser-radiation; and (d) interpreting a signal generated by said radiation-detector in response to said received, transmitted fraction of laser-radiation as measure of power of the laser-radiation coupled into the optical-fiber.

18. The laser-radiation-power monitoring method of claim 17, wherein said reflective coating is a multilayer dielectric coating including layers of different refractive index.

19. The laser-radiation-power monitoring method of claim 18 wherein said reflective coating is arranged to transmit about 0.5 percent of radiation from the diode-laser incident thereon.

20. The laser-radiation-power monitoring method of claim 17 wherein said reflective coating is a metal coating.

* * * * *